2,962,532
Patented Nov. 29, 1960

2,962,532
PREPARATION OF LOWER MONOALKYLHYDRAZINES

Allen F. Graefe, Pomona, Calif., assignor to Aerojet-General Corporation, Azusa, Calif., a corporation of Ohio No Drawing. Filed Oct. 14, 1957, Ser. No. 690,155

18 Claims. (Cl. 260—583)

This invention relates to a new and improved method of preparing monoalkylhydrazines, and in particular to a method for preparing methylhydrazine.

Monoalkylhydrazines, such as methylhydrazine, are known to be excellent high energy liquid rocket propellants, but presently known methods of preparing these compounds, such as those involving direct alkylation of hydrazine, are not completely satisfactory in that they are too expensive for large-scale manufacturing operations. Moreover, these methods result in the simultaneous formation of other products such as unsymmetrical dialkylhydrazines, which are inferior to monoalkylhydrazines as rocket propellants.

I have discovered a novel method of synthesis whereby monoalkylhydrazines may be prepared inexpensively and in high yield. My novel method comprises reacting hydrazine with an alkanone or an alkanal to form an azine alkanone or an azine alkanal; reacting the azine alkanone or alkanal with a dialkyl sulfate or an alkyl halide such as dimethyl sulfate or ethyl chloride to form a complex thereof; and hydrolyzing the complex to form the corresponding alkylhydrazine sulfate or halide from which the free alkylhydrazine is recovered by distillation in the presence of a base such as diethylenetriamine. The reactions take place in accordance with the general reaction scheme set forth below:

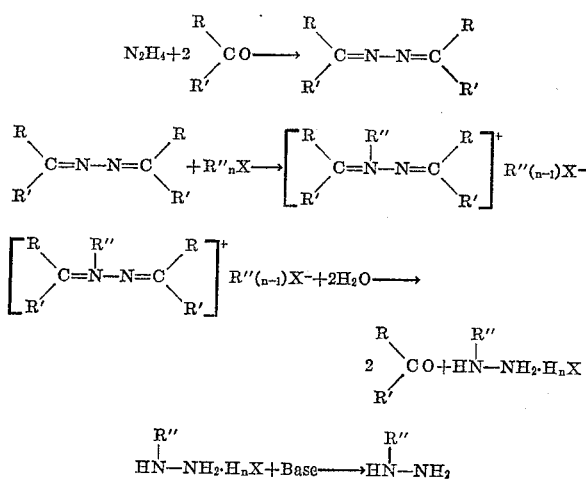

wherein R is an alkyl or hydrogen radical, R' is an alkyl or hydrogen radical, R'' is an alkyl radical, X is a sulfate or a halide radical, and $n$ is an integer corresponding to the valence of X.

Following are examples which are included for the purpose of more fully illustrating the present invention. These examples are intended for illustrative purposes only and should not be construed as limiting the invention to the particular embodiments and conditions disclosed therein.

EXAMPLE I
Preparation of dimethylketazine

This example illustrates the first step of my novel method of synthesis.

In a 500 ml. three-necked, round-bottomed flask fitted with a condenser, mercury sealed stirrer, and a dropping funnel, was placed 278 g. (4.8 moles) of commercial grade acetone. To the well stirred acetone, 68.5 g. of 93.5% hydrazine (64.1 g., 2.00 moles of anhydrous hydrazine) was added over a one hour period. The reaction was mildly exothermic. After the addition, the clear, colorless solution was taken up in one liter of ethyl ether, resulting in the formation of an aqueous (lower) layer. Analysis with standard potassium iodate solution of the separated layers indicated that 91.5% of the reducing ability of the original hydrazine was present in the ether layer, and that 9.0% was in the aqueous layer. Analysis by titration of the separate layers with standard hydrochloric acid indicated that hydrazine was absent from the ether layer, and that the amount of unreacted hydrazine in the aqueous layer was about one percent of the amount originally employed.

The aqueous layer was extracted three times with ether (50 ml., 25 ml., 25 ml.) and the extracts were combined with the original ether layer. The ether solution was then dried over anhydrous potassium carbonate, and fractionated in a 12'' Widmer spiral column at a reflux ratio of 5:1. Diethylcarbitol, B.P. 187° C., was used as a "chaser" to avoid loss of ketazine resulting from the hold-up (about 11 ml.) of the column. After the distillation of ether and acetone in the range 34° to 37° C. and a few drops of distillate in the range 37° to 133° C., the product, 210.4 g., was collected in the range 133° to 135° C. (94% of theory) (known B.P. 133). Analyses of the product by titrations with standard potassium iodate solution and standard acid were consistent with the composition 98.7% dimethylketazine—1.3% hydrazine.

EXAMPLE II
Preparation of methylhydrazine sulfate

To 104.4 g. (0.932 mole) of distilled dimethylketazine in a 500 ml. three-necked, round-bottomed flask fitted with a mercury sealed stirrer, a thermometer, and a dropping funnel, was added 126 g. (1.00 mole) of freshly distilled dimethyl sulfate. The addition required two hours, and the reaction mixture was maintained at 10° to 12° C. by means of an ice-water bath. The mixture was stirred an additional hour at about 12° C., and then permitted to warm slowly to room temperature. During the reaction period the mixture became viscous and slightly yellow. An analysis of an aliquot of the clear solution by titration with potassium iodate indicated a maximum yield of the dimethylsulfate - dimethylketazine complex of 91.5%, based on dimethylketazine.

The solution was again stirred, and 106 g. (8.9 moles) of water was added through the dropping funnel at 25° C. over a ten-minute period. The resulting clear, mobile solution was then heated to boiling under reduced pressure (25 mm.) to remove acetone, methanol, and excess water. After most of the volatile materials had been removed, methylhydrazine sulfate precipitated in large needles. The last traces of water were removed by azeotropic distillation with two 50-ml. portions of absolute ethanol. The yellow salt cake was then transferred to a Buchner funnel and washed with three 25-ml. portions of absolute ethanol. An analysis with potassium iodate indicated that the yellow filtrate contained a maximum of 13 percent of methylhydrazine sulfate, based on the original weight of dimethylketazine. The colorless filter cake weighed 100 g. after drying to constant weight in a vacuum desiccator over calcium chloride, representing a yield of methylhydrazine sulfate of 72.4% based on dimethylketazine. The crude sulfate melted at 137–141° C. (lit 141–2° C.), and a potassium iodate analysis of the material indicated a purity of 96.5%. Mixed melting point determinations of the crude sulfate with an authentic sample of methylhydrazine sulfate (M.P. 140–1° C., Eastman Kodak white label product) at two different compositions gave 137.5–141° C. and 137–141° C. Recrystallization of a portion of the crude sulfate from absolute ethanol gave colorless crystals, M.P. 141–2° C., mixed melting points with the Eastman product, 140–1° C., 140.5–1° C. The total yield of methylhydrazine sulfate from the dimethylsulfate-dimethylketazine complex was therefore in the range 72.4% to 85.4%, based on dimethylketazine.

EXAMPLE III

*Preparation of methylhydrazine*

This example illustrates the recovery of methylhydrazine from the methylhydrazine sulfate prepared in Example II. To 36 g. (0.25 mole) of the crude methylhydrazine sulfate prepared in Example II, M.P. 137–141° C., was added 34 g. (0.33 mole) of technical grade diethylenetriamine, and the liberated methylhydrazine was distilled through a 12″ Widmer spiral column at a reflux ratio of about 3:1. The following fractions were collected and analyzed for methylhydrazine content by titration with potassium iodate: I, $b_{193}$ 51–2° C., 5.0 g., 95.7% (lit $b_{193}$ of $CH_3NHNH_2$, 52° C.); II, $b_{193}$ 52–8, 1.3 g., 77.4%; and III, $b_{193}$ 58–69, 2.5 g., 60.0%. The recovery of methylhydrazine by this method was 67.5%.

Reaction temperature is not critical in any of the reactions involved in the present invention, the only significant effect of temperature variation being a corresponding increase or decrease in the rate of reaction. Although reaction temperature is not critical, for reasons of economy I prefer to conduct the reactions involved in the process of this invention, except for the formation of the complex from the di-ylidene derivative of hydrazine and the dialkyl sulfate or alkyl halide, at room temperature, since I have discovered that the reactions occur at a satisfactory rate at such temperature level. By room temperature, as the term is used herein, is meant a temperature within the range of from about 20° to about 30° C. To obtain optimum control of the above-mentioned complex forming reaction, I prefer to conduct this at a temperature of from about 5° to about 15° C., although, as previously indicated, the reaction takes place at room temperature as well as at other temperatures.

The first step of my novel method of synthesis, the preparation of the azine alkanone or alkanal by reacting hydrazine and an alkanone or an alkanal can be performed in an aqueous medium if desired. Thus, a dilute aqueous solution of hydrazine, such as that produced in the well-known Raschig process of hydrazine manufacture, can be treated with an alkanone or an alkanal to form the corresponding azine alkanone or alkanal which can then be recovered from the solution by extraction with an organic solvent such as ether, benzene or the equivalent. The azine alkanone or alkanal is easily separated from the organic solvent by distillation. Any organic or inorganic base is satisfactory for use in the distillation of the alkylhydrazine sulfate or halide to recover the free alkylhydrazine, in the practice of this invention. Thus, ammonia; monoamines such as n-butylamine, ethyl-sec-butylamine, etc.; polyamines such as ethylenediamine, diethylenetriamine, putrescine, etc.; alkali metal derivatives of alcohol such as potassium ethoxide, sodium methoxide, etc.; inorganic basic salts of alkali or alkaline earth metals such as sodium hydroxide, calcium hydroxide, sodium carbonate, etc., are all examples of bases which are suitable for my purpose. Although all of the above bases are within the scope of my invention, I prefer to use an organic base such as diethylenetriamine or potassium ethoxide in the distillation of the alkylhydrazine salt in order to avoid the formation of water which occurs when inorganic bases such as potassium hydroxide are employed.

The higher homologs of methylhydrazine within the scope of this invention can be prepared by employing higher dialkyl sulfates, such as diethyl sulfate, or higher alkyl halides, such as propyl bromide, butyl chloride, etc., to form an azine alkanone or azine alkanal complex; hydrolyzing the complex to form the corresponding alkylhydrazine sulfate or halide and recovering the free alkylhydrazine from its inorganic acid salt (sulfate or chloride) by distillation of said salt in the presence of a base such as diethylenetriamine.

Alkanones other than acetone, such as methyl ethyl ketone, dipropyl ketone, etc., and alkanals such as formaldehyde, n-butyraldehyde, etc., can be used to form the azine alkanone or azine alkanal in the practice of my invention. For example, hydrazine reacts with methyl ethyl ketone to yield azine methyl ethyl ketone which reacts with diethyl sulfate to yield a complex of these two compounds; the complex hydrolyzes to form ethylhydrazine sulfate from which the ethylhydrazine is recovered by distillation in the presence of potassium ethyl alcoholate ($KOC_2H_5$).

Also, hydrazine reacts with n-butyraldehyde to yield azine n-butyraldehyde, which reacts with propylbromide to yield a complex of these two compounds; the complex hydrolyzes to form propylhydrazine bromide, from which the propylhydrazine is recovered by distillation in the presence of diethylenetriamine.

I claim:

1. The method of preparing lower monoalkylhydrazines which comprises reacting hydrazine with a compound selected from the group consisting of lower alkanones and lower alkanals to form a symmetrical di-ylidene derivative of hydrazine; reacting the di-ylidene derivative of hydrazine with a compound selected from the group consisting of lower dialkyl sulfates and lower alkyl halides to form a complex thereof; and hydrolyzing the complex to form the corresponding inorganic acid salt of a lower monoalkylhydrazine.

2. The method of preparing lower monoalkylhydrazines which comprises reacting hydrazine with a compound selected from the group consisting of lower alkanones and lower alkanals to form a symmetrical di-ylidene derivative of hydrazine; reacting the di-ylidene derivative of hydrazine with a compound selected from the group consisting of lower dialkyl sulfates and lower alkyl halides to form a complex thereof; hydrolyzing the complex to form the corresponding inorganic acid salt of a lower monoalkylhydrazine; and distilling the inorganic acid salt of the lower monoalkylhydrazine in the presence of a base to obtain the free lower monoalkylhydrazine.

3. The method of claim 1 wherein the hydrazine and the compound selected from the group consisting of lower alkanones and lower alkanals are reacted in an aqueous medium.

4. The method of preparing lower monoalkylhydrazines which comprises reacting hydrazine with a lower alkanone to form the corresponding azine alkanone; reacting the azine alkanone with a lower dialkyl sulfate to form a complex thereof; and hydrolyzing the complex to form the corresponding lower alkylhydrazine sulfate.

5. The method of preparing monoalkylhydrazines which comprises reacting hydrazine with a lower alkanone to form the corresponding azine alkanone; reacting the azine alkanone with a lower alkyl halide to form a complex thereof; and hydrolyzing the complex to form the corresponding lower alkylhydrazine halide.

6. The method of preparing lower monoalkylhydrazines which comprises reacting hydrazine with acetone to form dimethylketazine; reacting the dimethylketazine with a lower dialkyl sulfate to form a complex thereof;

and hydrolyzing the complex to form the corresponding lower alkylhydrazine sulfate.

7. The method of preparing methylhydrazine which comprises reacting hydrazine with acetone to form dimethylketazine; reacting the dimethylketazine with dimethyl sulfate to form a complex thereof; and hydrolyzing the complex to form methylhydrazine sulfate.

8. The method of preparing methylhydrazine which comprises reacting hydrazine with acetone to form dimethylketazine; reacting the dimethylketazine with dimethyl sulfate to form a complex thereof; hydrolyzing the complex to form methylhydrazine sulfate; and distilling the methylhydrazine sulfate in the presence of diethylenetriamine to obtain the free methylhydrazine.

9. The method of claim 8 wherein the hydrazine and acetone are reacted in an aqueous medium.

10. The method of preparing ethylhydrazine which comprises reacting hydrazine with methyl ethyl ketone to form azine methyl ethyl ketone; reacting the azine methyl ethyl ketone with diethyl sulfate to form a complex thereof; hydrolyzing the complex to form ethylhydrazine sulfate; and distilling the ethylhydrazine sulfate in the presence of potassium ethoxide to obtain the free ethylhydrazine.

11. The method of preparing propylhydrazine which comprises reacting hydrazine with n-butyraldehyde to yield azine n-butyraldehyde; reacting the azine n-butyraldehyde with propyl bromide to form a complex thereof; hydrolyzing the complex to form propylhydrazine bromide; and distilling the propylhydrazine bromide in the presence of diethylenetriamine to obtain the free propylhydrazine.

12. The method of preparing lower monoalkylhydrazines which comprises hydrolyzing a complex of a symmetrical di-ylidene derivative of hydrazine and a compound selected from the group consisting of lower dialkyl sulfates and lower alkyl halides to form the corresponding inorganic acid salt of a lower monoalkylhydrazine.

13. The method of preparing lower monoalkylhydrazines which comprises reacting hydrazine with a compound selected from the group consisting of lower alkanones and lower alkanals, at a temperature of from about 20° to about 30° C., to form a symmetrical di-ylidene derivative of hydrazine; reacting the di-ylidene derivative of hydrazine with a compound selected from the group consisting of lower dialkyl sulfates and lower alkyl halides, at a temperature within the range from about 5° to about 15° C., to form a complex thereof; and hydrolyzing the complex, at a temperature of from about 20° to about 30° C., to form the corresponding inorganic acid salt of a lower monoalkylhydrazine.

14. The method of preparing lower monoalkylhydrazines which comprises hydrolyzing a complex of dimethylketazine and a lower dialkyl sulfate to form the corresponding lower alkylhydrazine sulfate.

15. The method of preparing lower monoalkylhydrazines which comprises reacting hydrazine with acetone, at a temperature of from about 20° to about 30° C., to form dimethylketazine; reacting the dimethylketazine with a lower dialkyl sulfate, at a temperature of from about 5° to about 15° C., to form a complex thereof; and hydrolyzing the complex, at a temperature within the range from about 20° to about 30° C., to form the corresponding lower alkylhydrazine sulfate.

16. The method of preparing methylhydrazine which comprises hydrolyzing a complex of dimethylketazine and dimethyl sulfate to form methylhydrazine sulfate, and distilling the methylhydrazine sulfate in the presence of a base to obtain the free methylhydrazine.

17. The method of preparing methylhydrazine which comprises reacting hydrazine with acetone, at a temperature of from about 20° to about 30° C., to form dimethylketazine; reacting the dimethylketazine with dimethyl sulfate, at a temperature of from about 5° to about 15° C., to form a complex thereof; and hydrolyzing the complex, at a temperature of from about 20° to about 30° C., to form methylhydrazine sulfate and distilling the methylhydrazine sulfate in the presence of a base to obtain the free methylhydrazine.

18. The method of claim 17 wherein the methylhydrazine sulfate is distilled in the presence of diethylenetriamine to obtain the free methylhydrazine.

No references cited.